*INVENTORS.*
JOHN M. CRAWFORD
WILLIAM E. N. DOTY
BY
*Floyd Trimble*
ATTORNEY

April 25, 1961   J. M. CRAWFORD ET AL   2,981,928
METHOD FOR ELIMINATING UNDESIRED COMPONENTS
OF COMPOSITE RECEIVED SIGNALS
Filed Oct. 20, 1954

INVENTORS.
JOHN M. CRAWFORD
WILLIAM E. N. DOTY
BY
*Floyd Trimble*
ATTORNEY

United States Patent Office 2,981,928
Patented Apr. 25, 1961

2,981,928
METHOD FOR ELIMINATING UNDESIRED COMPONENTS OF COMPOSITE RECEIVED SIGNALS
John M. Crawford and William E. N. Doty, Ponca City, Okla., assignors to Continental Oil Company, Ponca City, Okla., a corporation of Delaware
Filed Oct. 20, 1954, Ser. No. 463,552
8 Claims. (Cl. 340—15)

This invention relates to the art of determining the travel time of a signal propagated between spaced points over a plurality of paths and more particularly to an improved method and system of eliminating the effect of one or more components of the composite received signal on the parameter used in determining said travel times. It is a continuation-in-part of application, Serial No. 426,182, filed April 28, 1954.

The present invention is particularly applicable for the determination of the travel times of the several components into which a single transmitted signal may divide and which components respectively progress through different channels. The present invention will be found to be of particular utility in the field of seismic exploration. Since this field is one in which the invention will have great utility, it will be described as applied specifically to that field.

The process of determining these travel times by correlation has been described at length in Doty et al. application, Serial No. 339,374, filed February 27, 1953, now U.S. Patent No. 2,688,124, issued August 31, 1954, and application, Serial No. 426,182, filed April 28, 1954. When applying this process, the transmitted energy is frequently divided very unequally between the different paths and signals, having traveled along these paths, may arrive at certain receiving points with the same amount of time delay and may have large ratios between their respective amplitudes. Frequently the signals having the lower energy level are the ones which provide the desired information. In such cases, the correlation process disclosed in said application is sometimes unable to discriminate between equal travel time paths.

It is an object of this invention to provide an improved method and system of determining the travel time of a signal between spaced points whereby the undesired or masking effects of one component of the composite received signal on the parameter used to determine said travel time are substantially reduced.

Another object of the invention is to provide a new system and method of generating a seismic signal whereby horizontally-traveling waves generated successively at different spaced positions about a first point do not materially affect the parameter used in determining the travel times of the signal from said first point to a second point about which a multiplicity of detectors are located.

A further object of the invention is to provide a new method for eliminating surface waves and other undesired signals normally encountered in seismic prospecting by first precisely determining the principal characteristics, such as velocity and amplitudes, of such undesired signals and then sequentially generating signals at one or more locations spaced with respect to a reference point in accordance with certain of the principal characteristics of said undesired signals and receiving the transmitted signals at a plurality of locations remote from said reference point, spaced in accordance with said characteristics.

A further object of the invention is to provide a new method of cancellation of undesired signals by generation of energy at several points in which method the energy may be generated at different times and the resulting signal effects composited and evaluated at a later time.

Other objects of the invention will appear as the description proceeds.

Figure 3:
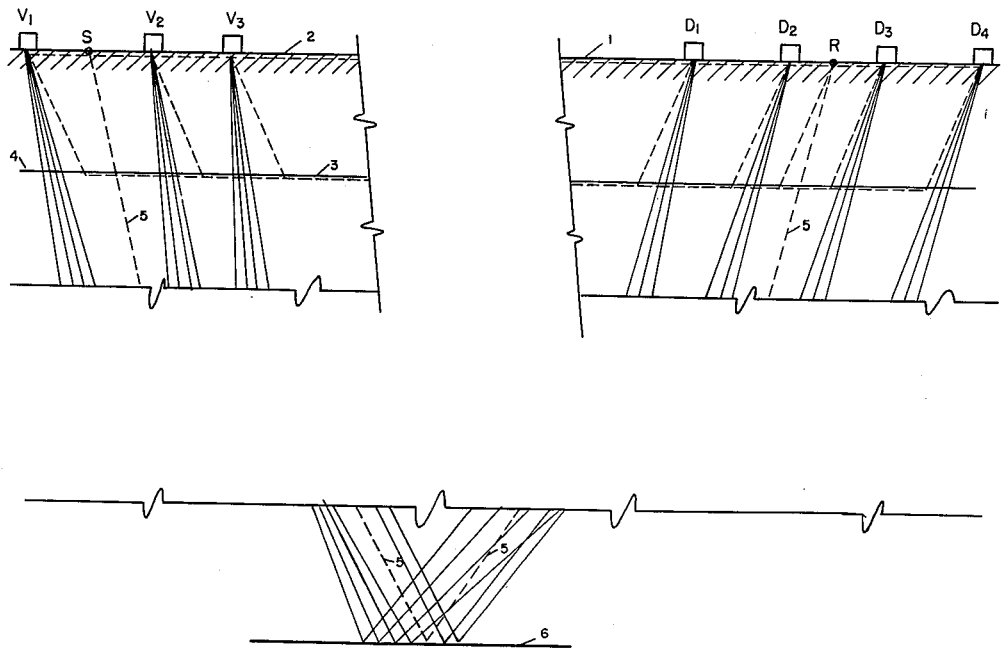
Figure 4:
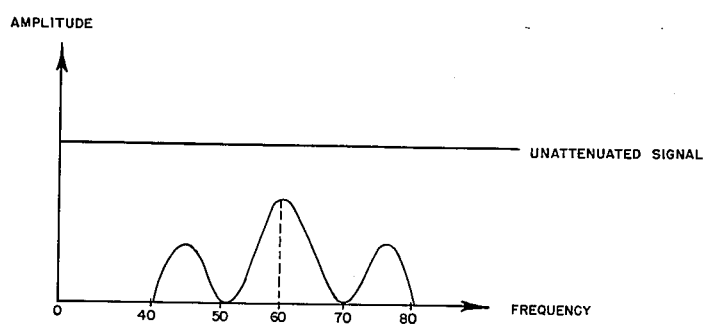

Fig. 3 is a diagrammatic representation similar to the previous figures showing yet another alternate form of the invention utilizing a plurality of vibrators and a plurality of detectors; and Fig. 4 is a diagram showing the theoretical attenuation of signals whose frequencies lie between 40 and 80 cycles per second when said signals are transmitted and received by an arrangement of vibrators and detectors such as that shown in Fig. 3. The signal is here assumed to travel through the earth with a horizontal velocity component equal to 3000 ft. per second.

Broadly stated, the present invention involves, in the analysis of seismic data obtained from time series corresponding to the transmission of elastic wave signals over different paths through a medium, the method of reducing the masking effect of a signal component transmitted over a particular one of said paths comprising:

a. Determining the apparent wave length of said component, and then b. Correlating a time series representative of the transmitted signal with a time series representative of two detected signals which have out-of-phase relation by an amount corresponding to one-half of said apparent wave length of said component.

Figure 1:
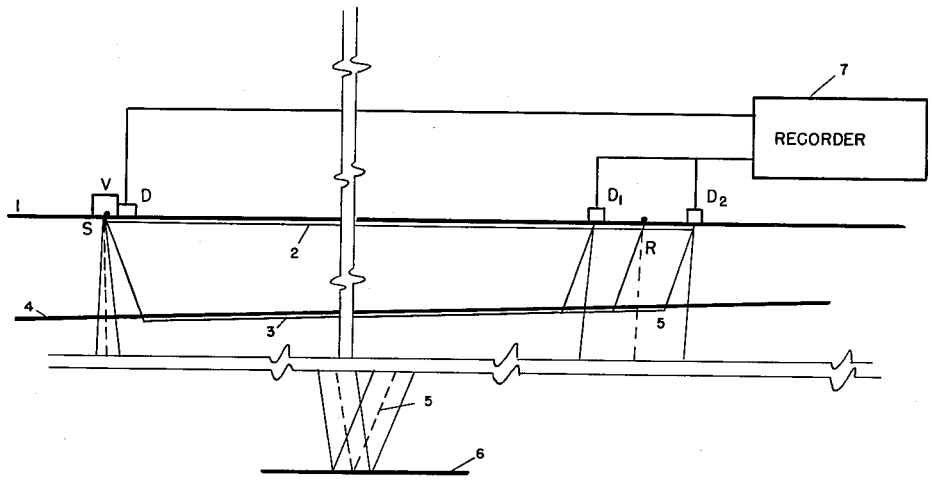
Fig. 1 is a schematic representation of a cross section of the earth indicating some of the different paths along which elastic energy may be propagated and one manner in which our invention may be carried out by the use of two detectors simultaneously and the two complex signals respectively received by such detectors are added before correlation.

The method and system comprising this invention can best be understood by having reference to Fig. 1. The major problem of seismic surveying is the accurate determination of the time taken by an elastic signal transmitted from a first point S to travel down to an interface between two beds of contrasting acoustic impedance, to be reflected by said impedance contrast and for the reflected signal to reach a second point R distant from said first point located on the surface of the ground. When an elastic signal is generated at S, it travels and reaches R via many different paths among which the total energy of the signal is divided. Such paths include the direct path along the surface from S to R, the refracted paths along high velocity beds close to the surface and the reflected paths. Many other waves are also known to exist like surface waves, interface waves, normal modes and so on, but they have not been indicated on the diagram for reasons of simplification, and knowledge of the exact origin of the waves being of no importance to the understanding of this invention.

The object of seismic surveying, particularly when applied to the search for oil, is to determine relatively deep geological structural information, and therefore, since in most cases the main energy paths involve relatively shallow penetrations and do not provide desired information, great efforts have been made in the past to try to eliminate their effects in the received signal. Also, in most cases, the main energy paths have slower velocities than other longer paths susceptible of furnishing structural information and signals traveling along these different paths may arrive simultaneously at the receiving point.

Referring again to Fig. 1, line 1 represents the surface of the ground on which two points S and R represent respectively the centers of areas where elastic signals are generated and detected. The different paths along which the transmitted signal may be divided are schematically indicated as follows: a direct path 2 along the surface, a refraction path 3 along a shallow high velocity bed 4, and reflection path 5 on a deep bed 6. One of the paths 2 or 3 usually constitutes the main energy path and its presence will be immediately apparent on the record obtained by application of the cross-correlation technique. Although complete details of this technique may be found in the above-mentioned application, it will be helpful to outline here the principle of the method.

A vibratory signal, made up of a succession of energy pulses and which is non-repetitive during a time interval which is substantially longer than the travel time of such signal along any of the paths by which it reaches a second point at usable energy levels, is transmitted from a first point and detected at said second point as a composite signal. For a predetermined period, which is at least as long as said travel time plus the uninterrupted duration of said transmitted signal, there are simultaneously and individually recorded time series respectively representative of said transmitted signal and said composite signal, and such time series are then correlated while shifting the time-phase relation thereof with respect to their time-phase relation as originally recorded.

The values obtained by this correlation process are plotted as correlation curves and indicate as a function of the amount of said time-phase shift the amount of correlation existing between the transmitted signal and the received composite signal. The amount of time phase shift necessary to provide the maxima of this correlation curve are indicative of the travel times of said signal along the plurality of paths between said first and second points.

It should be noted that the record used to store the time series must be a "memory record," i.e., it must constitute a long term memory device from which may be generated during playback signals which are representative of the frequency, amplitude, and phase relation or time shift of the signals originally recorded. Such records are usually of the photographic or of the magnetic type. Such records may be edited or "composited" before playback. Such editing or "compositing" is done by cutting and splicing of the film or tape on which the signals have been recorded in a manner entirely similar to that used in editing movie film. During such editing, undesired portions of any records may be cut out and the composite loop as finally produced may consist of a series of juxtaposed records or sections thereof taken in the same area but at different times to jointly contribute to the determination of a common correlation value. This great flexibility occurs because the correlation method operates in the time domain.

Thus, as indicated on Fig. 1, in order to reduce the contribution of this main energy path to said correlation value, the signal may be received by two detectors, $D_1$ and $D_2$, centered around R and spaced from each other by a distance equal to one-half of the apparent wave length of the interfering wave whose effect on the correlation value is to be reduced.

Throughout the following description and in the claims, we shall make use of the terms "apparent velocity" and "apparent wavelength." When a wave front is generated at the surface of the ground as illustrated, for example, in Figure 1, it progresses as a spherical front so that if the earth is flat in the vicinity of the point at which the wave is generated, its front may be visualized as an expanding hemisphere. When the string of detectors extends radially from the point at which the wave is generated, the wave front will progress along the line of the detectors at the actual velocity of the wave front. If, however, the line of detectors is arranged other than on a line extending truly radially from the point at which the wave is generated, then the rate at which the expanding wave front progresses along the line of detectors is greater than the actual velocity thereof, and this velocity at which the wave front progresses along the line of detectors we shall refer to hereinafter as the apparent velocity of the wave. It will be seen that if the angle between the line along which the detectors are located and the radial lines of propagation of the spherically expanding wave front increases or approaches 90 degrees, the apparent velocity increases tremendously. At 90 degrees the apparent velocity would, of course, be a maximum and if the distance between the point of generation of the wave and the line of detectors increases to the extent that the curvature of the expanding wave front approaches zero, the apparent velocity would approach infinity.

The wave fronts which provide the valuable information relative to the subsurface formations being investigated all have an extremely high apparent velocity as compared with the apparent velocity of the substantially horizontally propagated waves which contribute no worthwhile information. By our improved method, we are able to selectively discriminate between different signals on the basis of their apparent velocity and thus we are able to diminish substantially the effect on the composited record of those horizontally traveling waves which carry no real significant information and which moreover have such a high energy level as to materially mask the much lower energy waves which carry the sought for information.

It will thus be seen that just as the real wavelength of a signal is determined by its frequency and the true velocity of the expanding spherical wave front, the apparent wavelength is derived from the apparent velocity and frequency.

Since the signal used in the correlation technique is non-repetitive and thus has an overchanging frequency, this apparent half wave length $$\frac{\lambda a}{2}$$

which is related to the apparent velocity $V_a$, and the frequency $f$ by the relation $$\frac{\lambda a}{2} = \frac{V_a}{2f}$$

is continuously changing during the operation, so that only the energy component of the interfering wave in the neighborhood of the frequency $f$, corresponding to the distance between said detectors, and its harmonics $2f$, $3f$, . . . , are largely reduced.

In Fig. 1, a detector D has been indicated adjacent to the vibrator V to show how the transmitted signal may be sampled. This signal is then recorded by the recorder 7 as a first time series. The signals produced by the detectors $D_1$ and $D_2$ may be added together before recording and then a second time series is recorded corresponding to the received signals thus added. Or else, since the correlation technique operates in the time domain, the signal may be transmitted twice successfully by V and recorded as a first time series given by D, and simultaneously received during the first transmission by a detector placed in $D_1$ and then during the second transmission by a detector placed in $D_2$ and these two signals then recorded in immediate succession on the permanent recording medium of the recorder as a single second time series. By correlating these two time series it is possible to obtain a complete cancellation of the contribution of the energy generated at the frequencies for which the distance between the detectors is equal to an odd multiple of one half of the apparent wavelengths of the interfering signals. This can be explained in the following manner: The correlation technique consists in sampling the transmitted signal and the received signal, multiplying said transmitted signal by said received signal, integrating the products thus obtained for a determined period of time and repeating these steps for different values of time phase shift between said time series.

Thus, when the parts of the time series corresponding to the first transmitted signal and to the signal received at $D_1$ are correlated, products are formed which are positive or negative and when the part of the time series corresponding to the second transmitted signal and to the signal received at $D_2$ are correlated, the same products with the same signs are formed for the components of the received signals which reach $D_1$ and $D_2$ in phase, but these products are of opposite sign if the signals are 180° out-of-phase when they reach $D_1$ and $D_2$. This is just the case for the interfering wave at the frequency whose apparent half wavelength corresponds to the distance between $D_1$ and $D_2$. Thus, when these products are summed in the final integration, the energy transmitted at this frequency and traveling via this interfering path does not contribute to the value of the sum, generally referred to as correlation value.

The use of simultaneous or successive multiple detection of the received signal makes it possible to discriminate between wave paths or more precisely between waves reaching a detector simultaneously but at different apparent velocities. For sake of simplicity, only two detectors have been shown, but it is evident that a larger number may be used and for instance as many as 50 detectors or more may be put in series in line with the source or transversely or in other pattern combination at each receiving location and extending for distances up to 200 feet. This scheme will discriminate effectively against any interfering wave with an apparent velocity less than 25,000 feet/second, but will not affect a reflected wave arriving almost vertically with an apparent velocity of 40,000 feet or more.

Figure 2:
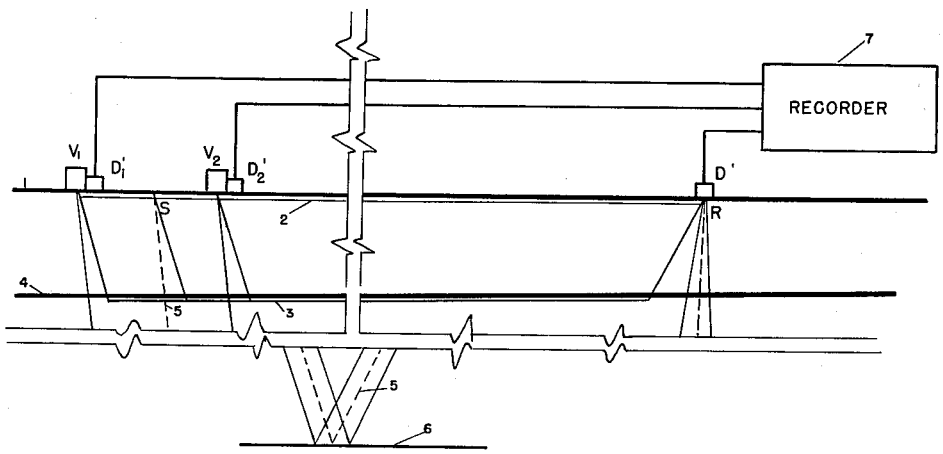
Fig. 2 is a schematic representation similar to Fig. 1 but showing an alternate form of our invention utilizing two vibrators to generate elastic energy signals and only one detector to receive the complex signal at a remote point.

Fig. 2 represents the same section of ground and the same numbers have been used to identify the beds and the different energy paths. However, this figure illustrates the use of two vibrators $V_1$ and $V_2$, combined with a single detector, $D_1$. Again the two vibrators may be operated simultaneously at $V_1$ and $V_2$ and the two corresponding sampling signals combined; but, in general, they will be operated successively, that is to say the same vibrator will be operated successively at $V_1$ and later at $V_2$ and the signals picked up by the sampling detectors, $D_1'$ and $D_2'$, are recorded as a single time series by the recorder 7. The composite signal received by detector $D'$ is recorded as a second time series by the recorder 7. Again, when these two time series are correlated, products of same sign are obtained from the correlation of the signal transmitted from $V_1$ and the corresponding signal received at $D'$ and from the correlation of the second parts of the time series corresponding to the signal transmitted from $V_2$ and received at $D'$, if the time phase relationship between the transmitted signal and the received signal are the same in both cases. If the distance between $V_1$ and $V_2$ is equal to an odd multiple of one-half of the apparent wavelength of an interfering wave at a certain frequency, the corresponding products are of opposite sign and cancel out during the integration step, and consequently, there is no contribution to the final correlation value of this part of the energy which was transmitted at that frequency and has traveled along said interfering wave path.

Again, instead of two vibrator positions, more may be used successively and a multiplicity of frequencies may be eliminated.

By combining the processes described in Fig. 1 and Fig. 2, further cancellation of the contribution of the energy which follows the interfering wave path may be obtained. This is indicated in Fig. 3 where again like numbers represent like elements. But, in this case, a plurality of vibrator positions as well as a multiplicity of detector positions are employed. For example, let us suppose that the application of the cross-correlation technique between a signal generated at S and the same signal received at R has demonstrated the existence of a high energy level path having an apparent velocity of 3,000 feet per second, corresponding for example to the direct surface path 2. This is indicated by a time-distance curve, derived from the corresponding peaks of the correlation curves, obtained by cross-correlating the original signals with the signals received by a plurality of detectors placed along a spread in line with S.

When this main energy path has been identified, it is of no further interest and better information concerning the other paths may be derived if its effects may be minimized. For this purpose, it is first necessary to determine the apparent velocity, along the spread of detectors on the surface, of the interfering wave. This velocity is immediately computed from the slope of a line drawn through the corresponding peaks of the curves obtained by cross-correlating the transmitted signal with the signals detected by the detectors located on said spread. It is equal to the ratio of the difference of the distances from the source to the farthest and the nearest detector divided by the difference of the corresponding travel times to said detectors of the interfering wave.

Different vibrator positions are then chosen to discriminate against the undesired main energy wave by computing its apparent wavelength from the velocity and the average frequency of the signal to be used and generating this said vibratory signal sequentially at positions spaced by an odd multiple of one-half of said apparent wavelength. In the case mentioned earlier of an interfering wave having an apparent velocity of 3,000 feet/second, the half wavelength is $$\frac{\lambda}{2} = \frac{V}{2f} = \frac{3000}{2f}$$

and thus half wavelengths of 18.75, 21.5, 30, and 37.5 feet correspond to frequencies of 80, 70, 50, and 40 cycles/second. Consequently, if the vibrator locations indicated in Fig. 3 as $V_1$, $V_2$, and $V_3$ are such that the distance $V_1V_2$ is 21.5 feet and $V_1V_3$ is 30 feet and a vibrator is successively operated at $V_1$ at frequencies varying from 40 to 80 cycles/second and at $V_2$ at frequencies varying from 60 to 80 cycles/second and finally at $V_3$ at frequencies varying from 40 to 60 cycles/second, and at the same time the composite signals are detected at each station R by an even plurality of detectors, $D_1$, $D_2$, $D_3$, $D_4$, coupled in series and spaced along the spread line at an interval of 18.75 feet, it is easily seen that the effect of this interfering wave on the correlation magnitude is attenuated at most frequencies.

Thus, when combining into a single correlation curve the recordings of the transmitted and detected signals obtained during the operation of the vibrator at $V_1$ and $V_3$ it is easy to see that the vibrators are located at one half the wavelength of the average frequencies generated at these two locations (50 cycles being the average of 40–60 cycles/second corresponding to one-half wavelength of 30 feet). Also, when frequencies varying from 60 to 80 cycles are generated at $V_2$, the distance between the vibrators are located at one-half the wavelength of the average frequencies generated at these two locations (70 cycles being the average of 60–80 cycles/second corresponding to one-half wavelength of 21.5 feet). Furthermore, the distance between the detectors coupled in series is equal to half a wavelength of an 80-cycle signal and the 80-cycle component of the interfering wave is thus eliminated and the other components are attenuated in the detected signal.

Accordingly, the arrangement indicated in Fig. 3 is efficient in minimizing the contribution of the interfering wave to the parameter used to determine the travel time. Some frequencies are better eliminated than others, but the over-all effect is very good if only frequencies in the neighborhood of those specified are generated at each particular location.

Fig. 4 indicates the frequency response of the system to an interfering wave traveling at the surface with an apparent velocity of 3,000 feet/second. It can be seen that most of the frequencies are attenuated and that, if any interference is noticeable, it will be produced by the frequency components of the spectrum which are centered around 60 cycles and which represent a relatively small portion of the total energy.

Other modes of applying the principle of the invention may be employed, change being made as regards the details described, provided the features stated in any of the following claims or the equivalent of such be employed.

We, therefore, particularly point out and distinctly claim as our invention:

1. A plurality of signal generators in contactual relation shop with the surface of the earth, each of said signal generating means imparting to the earth a unique elastic wave signal which is nonrepetitive and containing a known frequency spectrum, said unique signal being generated for a period of time which is at least as long as the travel time of said reflected signal, said plurality of signal generators having a plurality of different selected one-half wave length spacings therebetween, said one-half wave length spacings being selected at discrete frequencies throughout the known transmitted frequency spectrum, detecting means in contactual relationship with the earth and adapted to be responsive to said transmitted unique signal which is reflected from a subterranean strata, the orientation of said signal generators and the defined spacings between said generators with respect to said detecting means being such that the surface wave traveling between said plurality of generators and said detecting means is substantially cancelled.

2. An apparatus as described in claim 1 and further particularized in that said apparatus includes a recording means, the output signals from said detecting means being applied without modification directly to the input of said recorder means.

3. An apparatus as described in claim 1 and further including a recording means, the output signals from said detecting means being applied without alteration of said phase or frequency content of said output signal voltage directly to the input of said recording means.

4. In the art of seismic prospecting, a method for substantially reducing the effect of an interfering wave on a reflected signal which is received at a remote location comprising, generating a continuously variable nonrepetitive signal of known frequency spectrum for a period of time which is at least as long as the travel time of said reflected signal, receiving said generated signal during a plurality of individual transmissions at said remote location by a detector at a plurality of individual locations each location corresponding to an individual transmission whereby the apparent velocity and corresponding wave length of a plurality of known frequencies in said frequency spectrum are defined, locating said detector at a plurality of half wave length positions for a plurality of corresponding transmissions, defining said detector positions by systematically varying the detector spacing such that all of the frequency spectrum of the interfering wave will be substantially cancelled when the ouput from said detectors are combined.

5. In the art of seismic prospecting, a method for substantially reducing the effect of an interfering wave on a reflected signal which is received at a remote location comprising, determining the apparent velocity of a signal of known frequency content over the surface of the earth by transmitting a seismic signal into the ground at a plurality of locations; receiving said transmitted seismic signals at a fixed location, the change in time arrival of said seismic signals at said receiving location being determinative of said signal velocity; then, sequentially generating a new series of unique seismic signals having a known frequency content, frequency spectrum, and time duration; said series comprising, the generation of said unique signal at a first location, receiving said unique signal generated at said first location and recording said signal without substantial modification; then, generating an identical unique signal at a second location, said second location being spaced from said first location by one-half wave length of a selected frequency within the frequency spectrum generated by said unique signal, said wave length being determined from said apparent velocity; receiving said unique signal generated at said second location and recording said signal without substantial modification in time synchronism with said first received signal; then generating additional signals at additional locations being spaced one-half wave length for selected frequencies throughout said frequency spectrum of said unique signal, said frequencies being selected so that they are substantially evenly spaced throughout the frequency spectrum of said unique signal, receiving said additional signals and recording said additional signals without substantial modification in time synchronism with the signal received from said first location, the orientation of the series of seismic signals with respect to the location of said received signals being such that the corresponding one-half wave length signals that arrive directly without reflection or refraction from said transmitting locations to said receiving location are in cancellable phase relation; then, additively combining all of said synchronously recorded seismic signals to form a single signal whereby all of the interfering wave has been substantially eliminated.

6. A method according to claim 5, particularized further in that a plurality of detectors are used to receive said transmitted wave.

7. A method as described in claim 5 and further particularized in that the location of the new series of unique seismic signals and the location wherein the signals are received lie in substantially a straight line.

8. In the art of seismic prospecting an apparatus for substantially reducing the effect of an interfering surface wave on a subterranean reflected signal which is received at a remote location comprising: a signal generating means in contactual relationship with the surface of the earth, said signal generating means imparting to the earth a unique elastic wave signal which is nonrepetitive and containing a known frequency spectrum, said unique signal being generated for a period of time which is at least as long as the travel time of said reflected signal, a detecting array comprising a plurality of detectors having their outputs directly interconnected and additively coupled to a common pair of output terminals, said plurality of detectors mounted in contactual relationship with the earth, each of said detectors adapted to receive said transmitted elastic wave, the spacing between the detector nearest the transmitting means and all the remaining detectors being determined by selected one-half wave length spacings throughout said known transmitted frequency spectrum, sufficient number of detectors being spaced and oriented with respect to said transmitting source wherein substantial cancellation of said interference wave is accomplished, a recording means, the output signals from said common pair of output terminals being applied without substantial modification directly to the input of said recording means.

References Cited in the file of this patent

UNITED STATES PATENTS

| | | |
|---|---|---|
| 2,275,735 | Cloud | Mar. 10, 1942 |
| 2,473,469 | Dahm | June 14, 1949 |
| 2,580,636 | Wolf | Jan. 1, 1952 |
| 2,586,731 | Simon et al. | Feb. 19, 1952 |
| 2,634,398 | Piety | Apr. 17, 1953 |
| 2,657,373 | Piety | Oct. 27, 1953 |
| 2,676,206 | Bennett | Apr. 20, 1954 |
| 2,688,124 | Doty et al. | Aug. 31, 1954 |
| 2,696,891 | Neufeld | Dec. 14, 1954 |

UNITED STATES PATENT OFFICE
CERTIFICATE OF CORRECTION

Patent No. 2,981,928  April 25, 1961

John M. Crawford et al.

It is hereby certified that error appears in the above numbered patent requiring correction and that the said Letters Patent should read as corrected below.

Column 4, line 36, for "overchanging" read -- everchanging --; column 7, lines 16 and 17, for "relation shop" read -- relationship --.

Signed and sealed this 24th day of October 1961.

(SEAL)
Attest:

ERNEST W. SWIDER
Attesting Officer

DAVID L. LADD
Commissioner of Patents
USCOMM-DC